Sept. 13, 1966  B. J. WINESTOCK ETAL  3,273,037

CONTROL CIRCUIT

Filed Oct. 21, 1963

INVENTORS.
BERNARD J. WINESTOCK
JACK D. SHNABLE
BY
Bernard H. Michael
ATTORNEY.

United States Patent Office 3,273,037
Patented Sept. 13, 1966

3,273,037
CONTROL CIRCUIT
Bernard J. Winestock, Los Angeles, and Jack D. Shnable, Rolling Hills Estate, Calif., assignors to Controls Company of America, Melrose Park, Ill., a corporation of Delaware
Filed Oct. 21, 1963, Ser. No. 317,666
11 Claims. (Cl. 318—467)

This invention relates to electric control circuits and, more particularly, to triggered electric control circuits particularly well suited for use as a pulsing circuit for a rotary solenoid, or similar step drive, and, for convenience, will be discussed in that environment; however, this invention is not limited to such use but has wider application to any type of general seeking circuit where, in response to a control signal, a circuit control member is driven until it finds a particular circuit condition at which point a control function can be terminated or initiated as desired.

Electrically driven step drives constructed in accordance with heretofore accepted procedures have generally been driven by an electrical pulse supplied to the drive. A very limiting characteristic exists in this type of construction in that to insure completion of a full step the duration of the electric drive pulse must be equal to, or greater than, the time required for the step. Generally, this requires a pulse length in the millisecond range and a current carrying capacity in the full ampere range. Coordinating the design parameters of prior art constructions has been extremely difficult and, moreover, the prior art constructions do not lend themselves well to facile adjustment or selection of available steps and where such adjustment is attempted it merely aggravates the already complicated design considerations.

An object of this invention is to provide an improved circuit for controlling a stepping motor or the like.

A broader object is to provide a triggered circuit especially adapted for use in a seeking circuit arrangement.

A further object of this invention is to provide a control for a stepping motor, or the like, wherein the control pulse for initiating a particular stepped movement is not determined by the characteristics of the electrical energy necessary to complete the step.

A more specific object of this invention is to provide a triggered circuit for a stepping motor or the like wherein the initiating pulse can be a small fraction of the time and magnitude of the current necessary to achieve a particular step.

Another more specific object of this invention is to provide such a control circuit which requires an initiating pulse in the microsecond range and a current carrying capacity in the milliamp range.

For the achievement of these and other objects, this invention proposes the provision of a triggered circuit to control a solenoid-type stepping motor or other suitable circuit seeking control device. The circuit to the solenoid is controlled such that a relatively short, low magnitude pulse is sufficient to initiate the step and effect a holding circuit which insures completion of the step.

The novel features of this invention are set forth in the appended claims. The invention itself, together with additional objects and advantages thereof, will be more clearly understood from a reading of the following description in connection with the accompanying drawings, wherein a preferred embodiment of the invention is illustrated and in which:

Figure 3:
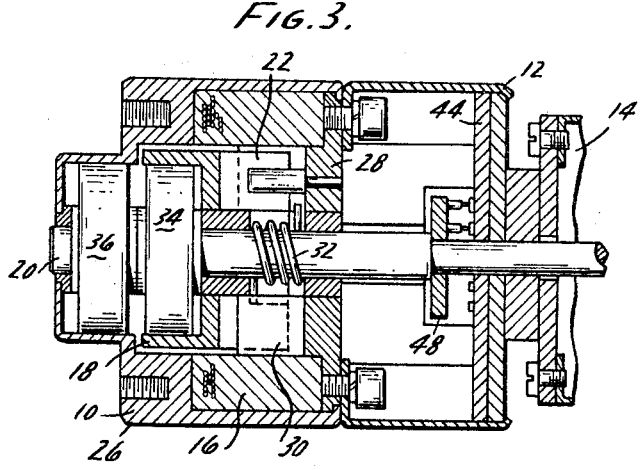
FIG. 3 illustrates a solenoid-type stepping motor with which the circuit of this invention can be used.

With particular reference to the drawings, a stepping motor is illustrated in FIG. 3 as including a solenoid drive portion 10, a power control and supply portion 12 and an output device 14 only a portion of which is illustrated and can take the form of a rotary switch, potentiometer, cams, or the like. Drive portion 10 includes a coil 16 and a rotor 18 arranged on an output shaft 20 and positioned in concentric and partially overlapping relationship with the coil. Rotor 18 includes a plurality of vanes 22 which are relatively spaced apart around the axis defined by shaft 20. Drive portion 10 also includes a stator made up of an outer housing 26 and an end plate 28 which includes a plurality of vanes 30 also relatively spaced around the axis defined by shaft 20 and alternately arranged between vanes 22 of the rotor. Spring 32 is engaged between the rotor and stator vanes and normally biases the vanes out of engagement so that upon energization of coil 16 the rotor vanes are attracted to the stator vanes to achieve a desired increment of angular movement of shaft 20. One-way clutch 34 establishes a driving connection between the rotor and the shaft and a second one-way clutch 36 is engaged between the stator and the shaft to prevent the shaft from backing up when the coil is de-energized and the rotor is returned to its normal position by spring 32. The step drive has been described briefly but preferably takes the form of the solenoid drive disclosed and claimed in the co-pending application of Bern W. Winestock, entitled "Step Drive," filed October 21, 1963, Serial No. 317,680, and assigned to the assignee of this invention, and the description in that co-pending application is relied upon for a complete disclosure of the drive portion.

Figure 1:
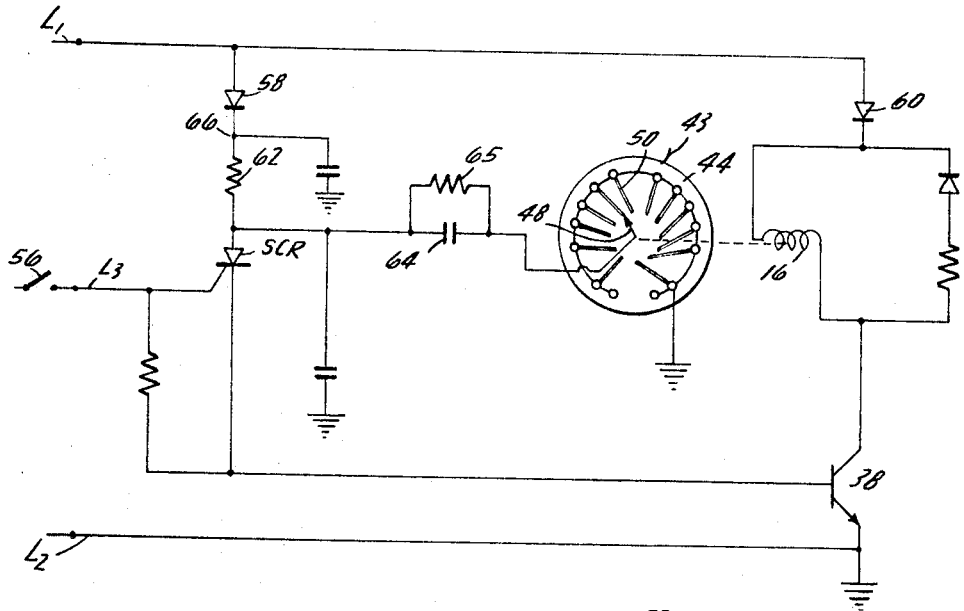
FIG. 1 is a circuit diagram illustrating a triggered circuit as used with a stepping motor of the solenoid-type.
Figure 2:
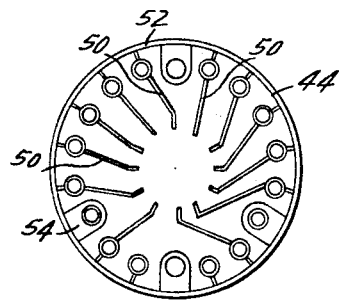
FIG. 2 illustrates the type of circuit board which can be utilized in the circuit control means.

The electrical circuit of power supply portion 12 is illustrated in FIG. 1 and includes leads $L_1$ and $L_2$ which are connected to a suitable source of electrical current (not shown). Coil 16 is connected in circuit with a switching device, such as transistor 38 which is normally in a non-conducting state so that the circuit to the coil 16 is normally open and no current flows through the coil. Transistor 38 controls energization of coil 16 and it is included as part of a triggered circuit which includes a silicon control rectifier SCR. The triggered circuit also includes circuit control means 43 in the form of a printed circuit board or wafer 44 associated with a movable brush arm 48. Printed circuit wafer 44 is illustrated in detail in FIG. 3 and in this instance includes contact strips 50 arranged in a circle on the wafer and in the path of movement of brush arm 48. Contact strips 50 are interconnected by a continuous conductive strip 52 and a suitable connection to ground can be made through any one of conductive portions 54. Brush arm 48 is suitably connected for rotation with shaft 20 and is movable between the interconnected grounded contacts 50, i.e. from a closed circuit condition in contact with one strip through an open circuit condition to a second closed circuit condition in engagement with another strip. The SCR controls the flow of current to the base of transistor 38 and is normally non-conductive so that the transistor is non-conductive and no current flows in coil 16. The characteristics of the SCR are such that it can be rendered conductive by a trigger pulse and after having been rendered conductive is further characterized by having a particular maintaining voltage at which it will remain conductive. The trigger pulse can be applied to the SCR through lead $L_3$ and a switch 56 of any suitable well-known construction can be used to permit selective pulsing of the SCR to render it conductive.

Assuming the solenoid to be in its rest position wherein the rotor vanes are spaced from the stator vanes, in this position brush arm 48 is in engagement with one of the contact strips 50. Diodes 58 and 60 are operative to apply direct current to both coil 16 and the SCR. With the drive at rest and brush 48 in engagement with one of the contact strips 50 and the SCR in an initial non-conducting state, a circuit is completed through diode 58, resistance 62, capacitor 64, brush arm 48 and contact strips 50 to ground, with capacitor 64 charging to the direct current potential at point 66. When it is desired to step the solenoid a short trigger pulse is applied to the SCR through lead $L_3$, by closure of switch 56, and the SCR is rendered conductive and electrical current flows through resistance 62 to the base of transistor 38 to impress the necessary potential on the base to render the transistor conductive and thus complete a circuit through coil 16 to energize the step drive.

Once having been rendered conductive the SCR will continue to conduct as long as the voltage applied thereto is at least equal to or above its maintaining voltage. With brush 48 connected for rotation with shaft 20 it will be moved from engagement with one of the grounded contacts 50 concurrently with initiation of stepping movement of shaft 20 to thereby open the circuit to ground and a maintaining voltage remains on the SCR and it continues to conduct even though the triggering pulse has ceased. As long as an open circuit condition continues at the circuit control means 43 the SCR continues to conduct and this condition will prevail until brush arm 48 re-engages one of the ground contact strips 50. During the open circuit condition and movement of brush arm 48 between contact strips 50 the charge accumulated on capacitor 64 discharges through resistance 64 and when brush arm 48 re-engages one of the grounded contact strips 50 it re-establishes a circuit to ground through circuit control means 43. Capacitor 64 again begins to charge and a portion of the voltage applied to the SCR is shunted from the SCR so that the voltage applied thereto is reduced below the maintaining voltage. The SCR is extinguished and the conducting bias is removed from the base of transistor 38 so that it too is extinguished and the current flow through coil 16 ceases. When this occurs spring 32 returns the rotor and stator vanes to their normal spaced positions and the stepping motor is ready for another stepping movement upon the application of a trigger pulse to the silicon control rectifier. Thus, both the mechanical drive and the electrical control are returned to their initial starting positions in readiness for another step operation.

With this arrangement the control pulse merely initiates current flow through the SCR, transistor 38 and coil 16 but does not determine the duration or length of the driven steps as was the case in prior art devices. Accurate control over a solenoid-type drive has been achieved with a one microsecond, two volt, five milliamp pulse. A uniform step can be taken each time and the duration and length of step can be varied simply by varying the relative position between grounded contact strip 50 to achieve either a longer or a shorter step, moreover, any combination of long and short steps can be provided on a single printed circuit wafer and the same short trigger pulse used to effect each step.

It will be appreciated that although a silicon control rectifier is the preferred switching device for use in the triggered control circuit of this invention other forms of switching devices could be utilized provided they exhibit the characteristics of being rendered conductive in response to a relatively short trigger pulse, remain conductive under a maintaining voltage and are turned off only when the voltage applied thereto falls below the maintaining voltage. Similarly other types of normally non-conducting switch means could be utilized in place of the transistor 38 again provided that it exhibits the characteristics of having its operational state switched in response to current flow through the SCR, or other suitable device. However, the use of the silicon control rectifier and the transistor is preferred since it provides an effective and completely solid state control circuit.

With the above description in mind it will be appreciated that this triggered circuit has applications beyond control of a step drive and can be applied in its broad aspect to any type of seeking circuit wherein the circuit control means can be driven, in response to a short trigger pulse, from one closed circuit condition through an open circuit to a second closed circuit condition independently of the duration or magnitude of the pulse. Also it will be appreciated that brush arm 48 could be driven from means other than the output member, so long as movement of the driving means is initiated in response to the control pulse and movement of brush arm 48 is coordinated with movement of the driving means.

Although but one embodiment of the present invention has been illustrated and described, it will be apparent to those skilled in the art that various changes and modifications may be made therein without departing from the spirit of the invention or from the scope of the appended claims.

What we claim is:

1. In a solenoid-type step drive including a coil, a rotor movable from a rest position through a predetermined angular step when said coil is energized, and means biasing said rotor to said rest position and operative to return said rotor to said rest position when said coil is de-energized; the combination with said coil of, a transistor connected in circuit with and controlling current flow through said coil, a silicon control rectifier in the base circuit of said transistor and normally in a non-conductive state so that said transistor is non-conductive and said coil is de-energized, electrical power supply means connected to and applying a voltage to said silicon control rectifier, switch means connected in said circuit with said silicon control rectifier on the input side thereof and having said voltage impressed thereon, said switch means comprising a plurality of relatively spaced grounded contacts and a switch arm movable between said contacts to alternately make and break a circuit from the input side of said silicon control rectifier to ground, said arm normally in engagement with one of said contacts when said silicon control rectifier is non-conductive, means for applying a switch-over pulse of relatively short duration to said silicon control rectifier to render it conductive to change the operational state of said transistor and energize said coil to initiate movement of said rotor, and means responsive to energization of said coil and operative, concurrently with rendering said silicon control rectifier conductive, to move said switch arm between said contacts and open said circuit to ground so that a voltage at least equal to the maintaining voltage of said silicon control rectifier is applied to said silicon control rectifier and said silicon control rectifier remains conductive until said switch arm re-engages one of said contacts to remove at least a portion of the maintaining voltage from said silicon control rectifier to render said silicon control rectifier nonconductive and de-energize said coil, whereby said angular step is determined by movement of said switch arm between contacts and not by the duration of said pulse.

2. The combination of claim 1 wherein said pulse is in the microsecond, millampere range.

3. The combination of claim 1 wherein said switch arm is connected with and movable with said rotor so that movement of said switch arm from one grounded contact to another is accomplished by said rotor.

4. In a solenoid-type step drive including a coil, a rotor movable from a rest position through a predetermined angular step in a particular elapsed time when said coil is energized, and means biasing said rotor to said rest position when said coil is de-energized; the combination with said coil of, a transistor connected in circuit with and controlling current flow to said coil, a silicon control rectifier in the base circuit of said transistor and normally in a non-conductive state so that said transistor is non-conductive and said coil is de-energized, said silicon control rectifier having a switch-over voltage at which it is rendered conductive and a maintaining voltage under which it remains conductive, electrical power supply means connected to and applying a voltage to said silicon control rectifier, switch means connected in said circuit with said silicon control rectifier and movable between closed circuit conditions in each of which said switch means establishes a shunt circuit with respect to said silicon control rectifier to remove at least a portion of the voltage on said silicon control rectifier and reduce the voltage on the silicon control rectifier to below said maintaining voltage and said electrical power supply means being effective to apply said maintaining voltage to said silicon control rectifier when said switch means is moving between said closed circuit conditions, means for applying a switch-over pulse of shorter duration than said elapsed time to said silicon control rectifier to render it conductive to change the operational state of said transistor and energize said coil to initiate movement of said rotor, and means responsive to energization of said coil and operative, concurrently with rendering said silicon control rectifier conductive, to move said switch means between said closed circuit conditions so that said maintaining voltage is maintained on said silicon control rectifier and said silicon control rectifier remains conductive until said switch means re-establishes one of said shunt circuits to reduce the voltage on said silicon control rectifier below the maintaining voltage for said silicon control rectifier to render said silicon control rectifier non-conductive and de-energize said coil, whereby said angular step is determined by movement of said switch means between said closed circuit conditions and not by the duration of said pulse.

5. In combination with electrical apparatus for producing movement of an output member in predetermined increments, a transistor connected in circuit with and controlling current flow to and energization of said electrical apparatus to drive said output member, a silicon control rectifier in the base circuit of said transistor and normally in a non-conductive state so that said transistor is non-conductive and said apparatus is at rest, electrical power supply means connected to and applying a voltage to said silicon control rectifier, switch means connected in circuit with said silicon control rectifier on the input side thereof and having said voltage impressed thereon, said switch means movable between closed circuit conditions in each of which said switch means establishes a shunt circuit with respect to said silicon control rectifier to remove at least a portion of said voltage from said silicon control rectifier and reduce the voltage on said silicon control rectifier to below said maintaining voltage and said electrical power supply means effective to apply said maintaining voltage to said silicon control rectifier when said switch means is moving between said closed circuit conditions, means for applying a switch-over pulse of relatively short duration to said silicon control rectifier to render it conductive to change the operational state of said transistor and energize said electrical apparatus to initiate movement of said output member, and means responsive to energization of said electrical apparatus and operative, concurrently with rendering said silicon control rectifier conductive, to move said switch means between said closed circuit conditions so that said silicon control rectifier remains conductive until said switch means re-establishes one of said shunt circuits to remove at least a portion of said voltage on said silicon control rectifier and reduce the voltage on said silicon control rectifier below the maintaining voltage for said silicon control rectifier to render said silicon control rectifier non-conductive and de-energize said electrical apparatus, whereby said increment of movement is determined by movement of said switch means between said closed circuit conditions and not by the duration of said pulse.

6. In combination with electrical apparatus for producing movement of an output member in predetermined increments, first switch means in circuit with and controlling energization of said electrical apparatus, said first switch means normally in a non-conducting state and characterized by having a switch-over voltage which, when impressed thereon, renders it conductive to energize said electrical apparatus to drive said output member, second switch means in circuit with and controlling said first switch means, said second switch means normally in a non-conducting state and characterized by being rendered conductive in response to a relatively short electrical pulse and thereafter remaining conductive so long as a maintaining voltage is applied thereto, electrical power supply means connected to and applying a voltage to said second switch means, means for selectively applying said pulse to said second switch means, circuit control means connected in circuit with said second switch means on the input side thereof and having said voltage impressed thereon, said circuit control means selectively movable between closed circuit conditions in each of which it establishes a shunt circuit relative to said second switch means to shunt at least a portion of the voltage from said second switch means to reduce the voltage on said second switch means below said maintaining voltage and between which closed circuit conditions it opens said shunt circuit to apply said maintaining voltage to said second switch means, and means responsive to energization of said electrical apparatus and operative, upon rendering said second switch means conductive, to move said circuit control means to open one shunt circuit and move toward establishing another shunt circuit so that said maintaining voltage is applied to said second switch means during the open circuit condition of said circuit control means as it moves between closed circuit conditions and said voltage falls below said maintaining voltage when a shunt circuit is re-established to thereby render said second switch means non-conductive and de-energize said electrical apparatus whereby each of said predetermined increments are determined by movement of said circuit control means between said closed circuit position and not by the duration of said pulse.

7. The combination of claim 6 wherein said circuit control means is connected to said output member for movement therewith so that upon energization of said apparatus said circuit control means is moved from one of said closed circuit conditions simultaneously with movement of said output member.

8. The combination of claim 7 wherein said pulse is in microsecond and milliampere range.

9. In combination with electrical apparatus for producing movement of an output member in predetermined increments, switch means in circuit with and controlling energization of said electrical apparatus, said switch means normally in a non-conducting state so that said drive means is de-energized and characterized by being rendered conductive in response to an electrical pulse and further characterized by having a maintaining voltage at which it remains conductive and below which it is non-conductive, electrical power supply means connected to and applying a voltage to said switch means, means for selectively applying said pulse to said switch means, and circuit control means in circuit with said electrical power supply means and said switch means and operative to selectively establish a shunt circuit relative to said switch means wherein at least a portion of the voltage normally applied to said switch means bypasses said switch means to thereby reduce the voltage thereon below said maintaining voltage and further operative to selectively open said shunt circuit to place at least said maintaining voltage on said switch means, said circuit control means responsive to energization of said apparatus and operative, concurrently with rendering said switch means conductive, to open said shunt circuit and thereby maintain at least said maintaining voltage on said switch means and subsequently to re-establish a shunt circuit whereupon the voltage on said switch means is reduced and said switch means is again rendered non-conductive and said electrical apparatus is de-energized.

10. In combination, electrical drive means operative when energized to effect a control function, switch means in circuit with and controlling energization of said drive means, said switch means normally in a non-conducting state so that said drive means is de-energized and characterized by being rendered conductive to energize said drive means in response to a electrical pulse and further characterized by remaining conductive so long as a predetermined maintaining voltage is applied thereto, electrical power supply means connected to and applying a voltage on said switch means, means for selectively applying said pulse to said switch means, circuit control means in circuit with said switch means and operative to selectively establish a first holding circuit condition wherein said maintaining voltage is applied to said switch means and a second circuit condition wherein at least a portion of said maintaining voltage is shunted from said switch means to thereby reduce the voltage on said switch means below said maintaining voltage to render said switch means non-conductive, and means responsive to energization of said electrical drive means and operative, concurrently with said switch means being rendered conductive by said pulse, to operate said circuit control means to said first holding circuit condition and after a predetermined time operating said circuit control means to establish said second circuit condition, whereby the duration of said control function is determined by the duration of said holding circuit condition and not by the duration of said pulse.

11. The combination of claim 10 wherein said circuit control means is connected to and operated between said first and second circuit conditions in accordance with movement of said drive means when energized.

References Cited by the Examiner

UNITED STATES PATENTS

| | | | |
|---|---|---|---|
| 2,953,728 | 9/1960 | Hatfield | 317—123 |
| 3,042,847 | 7/1962 | Welch | 310—49 X |
| 3,089,069 | 5/1963 | Thomas | 310—49 X |
| 3,193,733 | 7/1965 | Orsino | 317—148.5 |

MILTON O. HIRSHFIELD, *Primary Examiner.*

SAMUEL BERNSTEIN, *Examiner.*

L. T. HIX, *Assistant Examiner.*

UNITED STATES PATENT OFFICE
CERTIFICATE OF CORRECTION

Patent No. 3,273,037                           September 13, 1966

Bernard J. Winestock et al.

It is hereby certified that error appears in the above numbered patent requiring correction and that the said Letters Patent should read as corrected below.

Column 7, lines 5 and 6, strike out "drive means" and insert instead -- electrical apparatus --; line 25, before "apparatus" insert -- electrical --.

Signed and sealed this 29th day of August 1967.

(SEAL)
Attest:

ERNEST W. SWIDER                           EDWARD J. BRENNER
Attesting Officer                                Commissioner of Patents